United States Patent [19]

Yasuda

[11] 4,350,384

[45] Sep. 21, 1982

[54] DEVICE FOR OPENING A BACK DOOR OF AN AUTOMOTIVE VEHICLE

[75] Inventor: Akira Yasuda, Tokyo, Japan

[73] Assignee: Nissan Motor Co., Ltd., Yokohama, Japan

[21] Appl. No.: 206,107

[22] Filed: Nov. 12, 1980

[30] Foreign Application Priority Data

Nov. 17, 1979 [JP] Japan ................................ 54-149879

[51] Int. Cl.[3] ................................................ B60J 1/00

[52] U.S. Cl. ...................................... 296/146; 49/357; 292/DIG. 43; 296/37.16

[58] Field of Search ............... 296/146, 37.16; 49/357; 292/336.3, DIG. 43, 94, 216, 280

[56] References Cited

U.S. PATENT DOCUMENTS

| | | | |
|---|---|---|---|
| 1,005,054 | 10/1911 | Miles | 292/255 |
| 1,172,205 | 2/1916 | Gillentine | 292/255 |
| 2,809,030 | 10/1957 | Clark | 49/357 |
| 4,097,077 | 6/1978 | Gahrs | 292/216 |
| 4,202,571 | 5/1980 | Nishikoori | 292/DIG. 43 |
| 4,202,578 | 5/1980 | Roullier | 296/37.16 |

FOREIGN PATENT DOCUMENTS

| | | |
|---|---|---|
| 1198236 | 8/1965 | Fed. Rep. of Germany . |
| 2601149 | 7/1976 | Fed. Rep. of Germany . |
| 305715 | 2/1929 | United Kingdom . |
| 333471 | 8/1930 | United Kingdom . |
| 360207 | 11/1931 | United Kingdom . |
| 639892 | 7/1950 | United Kingdom . |

*Primary Examiner*—Richard A. Bertsch
*Assistant Examiner*—John A. Carroll
*Attorney, Agent, or Firm*—Thompson, Birch, Gauthier & Samuels

[57] ABSTRACT

A device for opening a back door of an automotive vehicle which can be operated by an operator's foot. A foot pedal is located at a rear and lower portion of the automotive vehicle in an accessible position. The foot pedal is connected by actuating means to lifting means for lifting the back door in such a manner that the back door can rotate around the upper edge thereof to be opened. A door-lock release device is actuated in response to operation of the lifting means to release the lock of a locking device. The actuating means includes means for disconnecting the linkage between the lifting means and the foot pedal so that operation of the foot pedal cannot be transmitted to the actuating means.

8 Claims, 2 Drawing Figures

DEVICE FOR OPENING A BACK DOOR OF AN AUTOMOTIVE VEHICLE

BACKGROUND OF THE INVENTION

This invention relates to a device for opening a back door of an automotive vehicle such as a van type vehicle.

A back door of a van type automotive vehicle or truck is usually not opened by releasing the lock of a door-lock device and must be positively opened by hand. If the operator wishes to load the vehicle with goods or the like that he is carrying, he must first put the goods down, then open the back door by hand, and then load the goods. This is very inefficient.

SUMMARY OF THE INVENTION

It is an object of the present invention to provide a device for opening a back door of an automotive vehicle in which worker efficiency can be increased in view of the above-stated defects of the prior art.

A further object of the present invention is to provide a device for opening a back door of an automotive vehicle wherein an operator's foot can open the back door even if it is locked by a door lock device.

According to the present invention, there is provided a device for opening a back door of an automotive vehicle by an operator's foot. A foot pedal is placed at a rear and lower portion of the automotive vehicle in a proper position where the foot pedal can be easily kicked on. The foot pedal is connected through actuating means to lifting means for lifting the back door in a manner that the back door can rotate around the upper edge thereof to be opened. A door-lock release device is actuated in response to operation of the lifting means to release a locking device. It is preferable that the actuating means includes means for disconnecting the linkage between the lifting means and the foot pedal so that the kicking force of the foot pedal cannot be transmitted to the actuating means.

BRIEF DESCRIPTION OF THE DRAWINGS

These and other objects, features and advantages of the present invention will become more apparent from the following description of a preferred embodiment thereof when taken in conjunction with the accompanying drawings in which.

DETAILED DESCRIPTION OF THE PREFERRED EMBODIMENT

Figure 1:
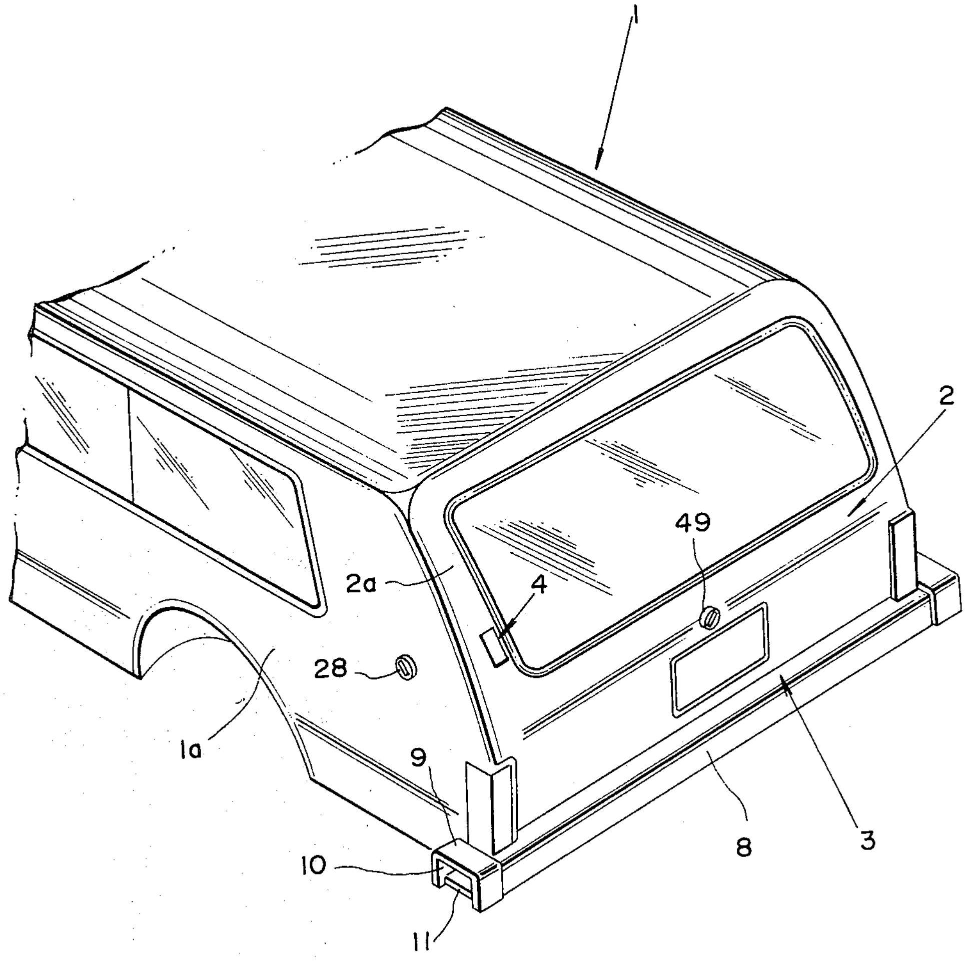
FIG. 1 is a diagramatic perspective view showing a rear portion of an automotive vehicle equipped with a device for opening a back door thereof according to the present invention.

Referring now to FIG. 1, a van type automotive vehicle body 1 has at its rear end a back door 2 in a well-known manner. That is, the back door 2 is hinged to the upper edge of a back opening 3. Lifting means such as a door lifter 4 is provided at a side edge of the back opening 3 in such a manner that the back door 2 can rotate around the upper edge thereof to be opened.

Figure 2:
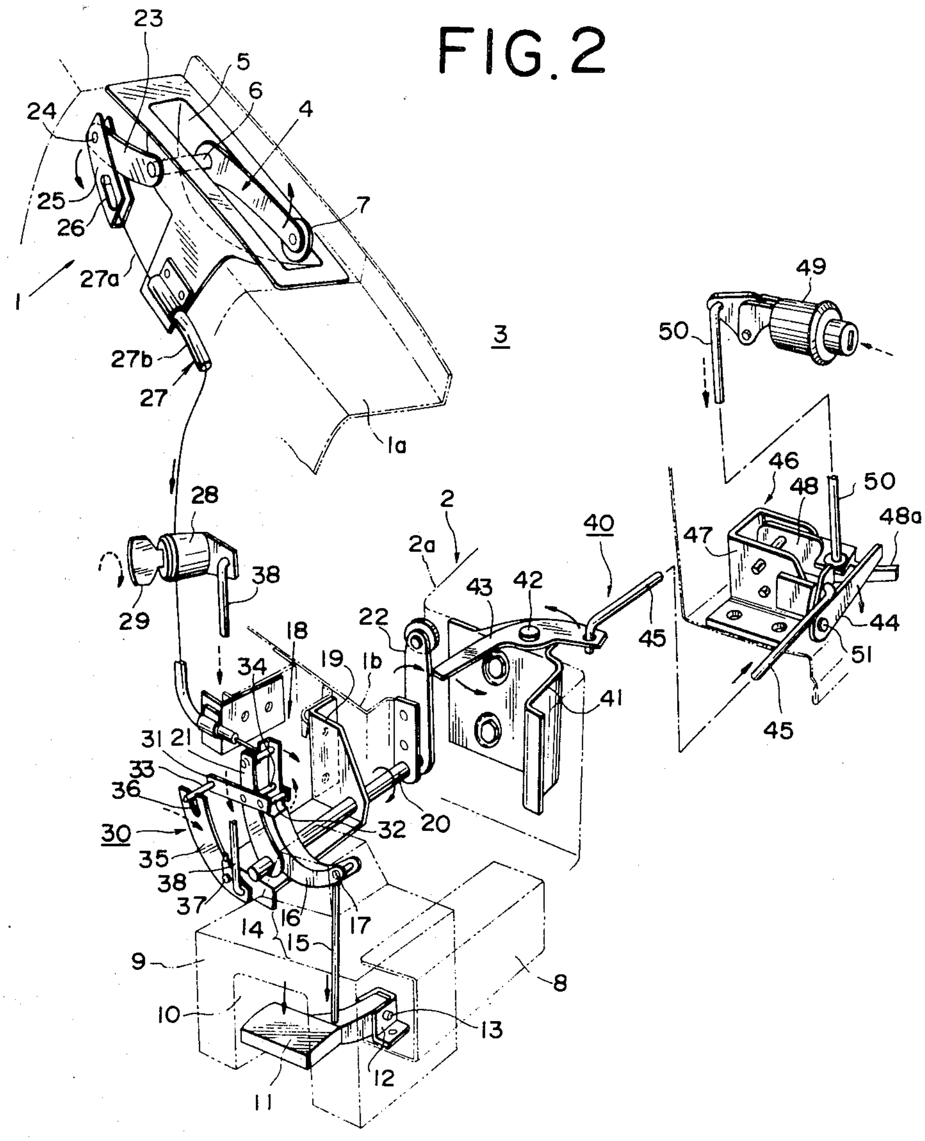
FIG. 2 is a perspective view showing a device for opening a back door of an automotive vehicle according to a preferred embodiment of the present invention.

As best shown in FIG. 2, the base end of the lifter 4 is pivotally supported by a pivot pin 6 mounted in a recessed portion 5 on the rear face of a back pillar outer panel 1*a* of the vehicle body 1. The door lifter 4 is actuated by a lifter actuating mechanism 18 which will be later described. The other end of the door lifter 4 has a roller 7 which engages the underside of the side frame 2*a* of the back door 2 to lift the back door upwardly so that it can rotate to be opened.

A foot pedal 11 is placed at a rear and lower portion of the automotive vehicle body 1 in a location where it is easily accessible. For example, the foot pedal 11 is placed in a receiving space 10 formed in a bumper end portion 9 formed of a rubber, resin or the like at a side of a rear bumper 8. The foot pedal 11 is rotatable around a pin 13 provided in a bracket 12 fixed to the interior of one end of the rear bumper 8. The lower end of a rod 15 is connected to an intermediate portion of the foot pedal 11. The end of the rod 15 is connected by a pin 17 to one end of an arcuate lever 16. The lever 16 is supported by the shaft 20 of the lifter actuating mechanism 18 which will be described in detail. A pedal linkage 14 includes the rod 15 and the lever 16.

The lifter actuating mechanism 18 is placed within a rear portion of the vehicle body near the foot pedal 11. The lifter actuating mechanism 18 also includes the shaft 20, a driven lever 21, a driving lever 22 and a bowden cable 27. The shaft 20 is rotatably supported by a back pillar inner panel 1*b* and a bracket 19 fixed to the back pillar inner panel. The driven lever 21 is fixed at its lower end portion of one end of the shaft 20 and arranged laterally over the upper portion of the lever 16. The driving lever 22 is adapted to release the door lock and is fixed to one end of the shaft 20 adjacent a through hole in the back pillar inner panel 1*b* so that the shaft 20 and the driving lever 22 can rotate together. The bowden cable 27 extends from the free end of the driven lever 21 to a movable lever 25 connected by a pin 24 to a lever 23 fixed to one end of the pivot pin 6 around which the door lifter 4 is rotatable.

A disconnecting mechanism 30 is included in the lifter actuating mechanism 18 to disconnect the linkage between the lifter 4 and the foot pedal 11 so that the kicking force of the foot pedal 11 cannot be transmitted to the door lifter. A cylinder type key lock device 28 is attached to the back pillar outer panel 1*a* to actuate the disconnecting mechanism 30. The disconnecting mechanism 30 includes a first lever 31 and a second lever 35. The first lever 31 is joined by a pin 34 to the driven lever 21 at an intermediate portion of the first lever 31 so that the first lever can rotate around the pin 34. The first lever 31 has at one end a pin 32 which faces the upper portion of the arcuate lever 16 in such a manner that the pin 32 can engage the arcuate lever 16, according to the rotation angle of the first lever 31. A joint pin 33 extends laterally from the other end of the first lever 31. The second lever 35 is rotatably supported by a pin 37 on the bracket 19. A slit 36 is formed in the upper end of the second lever 35 so that the joint pin 33 can engage the slit 36 to connect the first lever 31 with the second lever 35. The lower end of the second lever 35 is connected by a rod 38 to the key lock device 28.

The disconnecting mechanism 30 is actuated when a key 29 is inserted into the key lock device 28 and rotated in a given direction to pull the rod 38 upwardly. The second lever 35 rotates counterclockwise in FIG. 2 to rotate the first lever 31 counterclockwise. As a result, the pin 32 disengages from the arcuate lever 16 so that the pedal linkage 14 is disconnected from the lifter actuating mechanism 18. Thus, in this condition, when the foot pedal 11 is kicked, the kicking force is not transmitted from the pedal linkage 14 to the lifter actuating mechanism 18 so that the door lifter 4 cannot be lifted. Only the pedal linkage 14 moves freely without engagement thereof with the other members. Therefore, when the back door 2 is closed and locked, the door lifter 4 is never lifted so that the back door 2 is not accidentally opened even if the foot pedal 11 is kicked, for example, by a child.

The engaging portion of the movable lever 25 of the door lifter 4 has a slot 26 which retains the upper end of the bowden cable inner wire 27*a*. The slot 26 provides a play stroke to the upper end of the inner wire 27*a* so that it can move within the slot. Thus, when the foot pedal 11 is kicked, the door lifter 4 is actuated after a door lock device 46 is released, as will be hereinafter described in detail.

The door lock device 46 is arranged for locking the back door 2 to the back opening of the automotive vehicle body 1. A key lock device 49 is connected through a rod 50 to the lock device 46. Such an arrangement of the door lock device 46 and the key lock device 49 is well known.

In addition, a door-lock release device 40 is provided to the back door 2. The door-lock release device 40 is designed to release the door lock device 46 in response to the lifter actuating mechanism 18. The door-lock release device 40 includes a first lever 43, a second lever 44 and a rod 45. The first lever 43 is rotatably supported by a pin 42 on a bracket 41 fixed to a side portion of the back door side frame 2*a*. One end of the first lever 43 extends over the back edge of a door-lock release driving lever 22 of the lifter actuating mechanism 18 so that that end of the first lever 43 can be pushed by the door-lock release driving lever to rotate in the direction shown by the arrow when the door-lock release driving lever is rotated by the shaft 20. The second lever 44 is rotatably supported by a pin 51 on a door lock base 47 and has one end adapted to engage an engaging piece or element 48*a* of a lever 48. The rod 45 connects the other end of the first lever 43 with the other end of the second lever 44.

Before the door lifter 4 begins to lift the back door 2 when the foot pedal 11 is kicked, the door-lock release during lever 22 pushes the first lever 43 so that rotation of the first lever 43 is transmitted through the rod 45 to the second lever 44 which pushes down on the rear end or engaging piece 48*a* of the lever 48 whereby the lever is disengaged from a striker (not shown) fixed to the vehicle body. A key (not shown) is inserted into the key lock-device 49 and rotated in a given direction to move the rod 50 downwardly.

The operation of the back door opening device as above-stated will be described as follows:

Normally, the back door 2 is closed and locked by the door lock device 46. When it is desired to open the back door 2, first of all, the key 29 is inserted into the cylinder key lock device 28 and rotated in a direction such that the rod 38 moves downwardly. Thus, the pin 32 located at the outer end of the first lever 31 of the disconnecting mechanism 30 moves into engagement with the upper end portion of the arcuate lever 16 of the pedal linkage 14. In this condition, when the pedal 11 is kicked, the rod 15 moves down so that the arcuate lever 16 and the driven lever 21 of the lifter actuating mechanism 18 rotate together clockwise in FIG. 2. Also, the door-lock release driving lever 22 fixed at the right end of the shaft 20 rotates clockwise. At that time, the joint pin 33 at the other end of the first lever 31 of the disconnecting mechanism 30 merely slides within the slot 36 formed at the upper end of the second lever 35 so that rotation of the first lever 31 is not transmitted to the second lever 35.

Rotation of the driven lever 21 pulls downwardly on the inner wire 27*a* of the bowden cable 27 within the outer tube 27*b* thereof. The upper end of the inner wire 27*a* of the bowden cable 27 moves within the slot 26 of the movable lever 25 with some play. Thus, the door lifter 4 does not begin to be actuated immediately after the inner wire 27*a* of the bowden cable 27 is pulled in response to kicking of the foot pedal 11.

On the other hand, when the foot pedal 11 is kicked, the shaft 20 rotates together with the door-lock release driving lever 22 in the direction shown by the arrow, so that the door-lock release driving lever pushes the left end portion of the first lever 43 of the door-lock release device 40 to rotate the first lever. This rotation of the first lever 43 is transmitted through the rod 45 to the second lever 44 pushing down on the engaging portion 48*a* of the lever 48 to disengage it from the striker fixed to the vehicle body.

Prior to the lifting operation of the door lifter 4, the door lock device 46 is released. Thereafter, the upper end of the inner wire 27*a* of the bowden cable 27 reaches the frontmost position of the slot 26 and begins to actuate the door lifter 4. That is, rotation of the driven lever 21 is transmitted through the inner wire 27*a* to the movable lever 25 of the door lifter 4 to pull the movable lever so that the lever 23 fixed at its base end to the pivot pin 6 rotates the pivot pin. Thus, the lifter 4 begins to rise upwardly. The roller 7 at the upper end of the door lifter 4 abuts against and pushes outwardly the side frame 2*a* of the back door 2 to open the back door.

When the back door 2 is opened at a predetermined angle to the back opening of the vehicle body, it is automatically further opened by a torsion bar affixed to a door hinge means or by an auxiliary opening mechanism such as a gas stay arranged between the back door and the back opening of the vehicle body which are not shown because they are well known. The back door 2 is also held in a completely opened position by the torsion bar or the auxiliary opening mechanism.

After the back door 2 is closed, the key 29 is rotated so that the rod 38 of the disconnecting mechanism 30 moves up. The second lever 35 rotates counterwise with the pin 33 so that the first lever 31 rotates counterclockwise. Thus, the pin 32 at the outer end of the first lever 31 is disengaged from the arcuate lever 16 of the pedal linkage 14. Thereafter, even if the foot pedal 11 is kicked, the door lifter 4 is not actuated. It is apparent that the back door 2 can be opened manually or by hand if the back door cylinder key lock device 49 is actuated to release the door lock device 46.

As can be seen from the foregoing, according to the present invention, the back door of the automotive vehicle can be opened by foot. Therefore, even if the operator holds some goods in his hands, he can open the back door easily by his foot. It is extremely convenient.

What is claimed is:

1. A device for opening a back door of an automotive vehicle, the back door being used to close a back opening of the automotive vehicle, comprising:

a door-lock device for securing the back door when the back door closes the back opening of the automotive vehicle;

a door-lock release device for causing the door-lock device to release the back door;

a foot pedal placed at a rear and lower portion of the automotive vehicle in a position where the foot pedal is readily accessible;

means for lifting the back door in such a way that the back door rotates around the upper edge thereof to be opened, the door-lock release device being actuated in response to operation of the lifting means to cause the door-lock device to release the back door; and means for actuating the lifting means in response to actuation of the foot pedal, the actuating means being mounted within the body of the automotive vehicle.

2. The device of claim 1, wherein the lifting means is located at a side edge of the back opening of the automotive vehicle in such a manner that the lifting means pushes upwardly the underside of a side edge of the back door.

3. The device of claim 1, wherein the lifting means includes a lifter located at a side edge of the back opening of the automotive vehicle, the lifter rotating with respect to the side edge of the back opening to push at its one end portion upwardly against the back door so that the back door is opened when the actuation force of the foot pedal is transmitted through the actuating means to the lifter in order to rotate the lifter.

4. The device of claim 1, wherein the actuating means includes means for disconnecting the linkage between the lifting means and the foot pedal so that the actuation force of the foot pedal is not transmitted to the door lifter when the disconnecting means is actuated.

5. The device of claim 4, further comprising a key lock device for actuating the disconnecting means.

6. The device of claim 1, wherein the foot pedal is located in a side portion of a rear bumper fixed at the rear of the automotive vehicle.

7. The device of claim 5, wherein the key lock device and the disconnecting means are connected by a rod.

8. The device of claim 1, wherein the actuating means and the lifting means are connected by a cable, and the actuating means and the foot pedal are connected by a rod.

* * * * *